United States Patent [19] [11] 4,354,264
Wurst [45] Oct. 12, 1982

[54] DIGITAL RING CONTROL SYSTEM FOR DIGITAL MULTIPLEXER

[75] Inventor: Walter K. Wurst, Guelph, Canada

[73] Assignee: International Standard Electric Corporation, New York, N.Y.

[21] Appl. No.: 159,736

[22] Filed: Jun. 16, 1980

[51] Int. Cl.$^3$ .............................................. H04J 3/12
[52] U.S. Cl. ..................................... 370/110; 370/56
[58] Field of Search ............. 370/110, 56; 179/18 FC, 179/18 HB

[56] References Cited

U.S. PATENT DOCUMENTS 3,443,033  5/1969  Louis .................................... 370/110
3,529,089  9/1970  Davis et al. ........................... 370/56
4,001,514  1/1977  Wurst ............................. 179/18 FC

OTHER PUBLICATIONS

"A Digital Carrier–Concentrator System with Elastic Traffic Capacity", by F. S. Boxall, *IEEE Trans. on Commns.*, vol. COM-22, No. 10, Oct. 1974, pp. 1636–1642.
"Traffic Engineering for an Elastic Carrier–Concentrator System", by F. S. Boxall, *IEEE Trans. on Commns.*, vol. COM-22, No. 10, Oct. 1974, pp. 1643–1650.
"Subscriber Line Equipment for an Elastic Carrier Switching System", by R. R. Buss, *IEEE Trans. on Commns.*, vol. COM-22, No. 10, Oct. 1974, pp. 1651–1657.

*Primary Examiner*—Thomas W. Brown
*Attorney, Agent, or Firm*—James B. Raden; Marvin M. Chaban

[57] ABSTRACT

A ringing control system which receives ring inputs, detects the type of input, translates the input into digital PCM format for transmission across a digital line such as a multiple channel span line. At the remote end of the line, the PCM signals are reconverted into relay operating data for emitting output signals of types corresponding to the input ringing signals. The ringing signals may be divided ring for either the tip lead or the ring lead and also may be frequency selective, superimposed or coded ringing. The arrangement is designed for use in a digital multiplexer or subscriber loop multiplexer.

7 Claims, 16 Drawing Figures

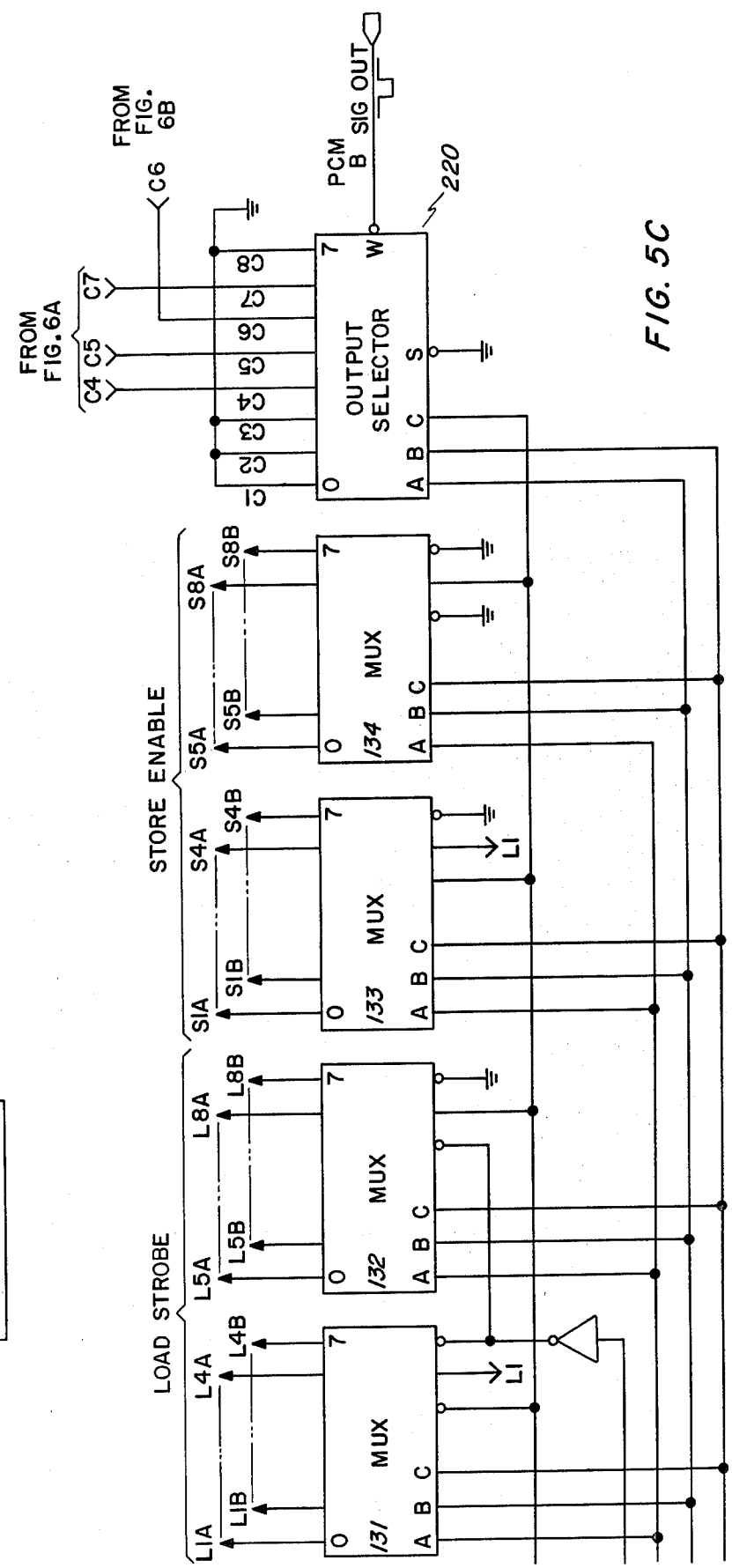
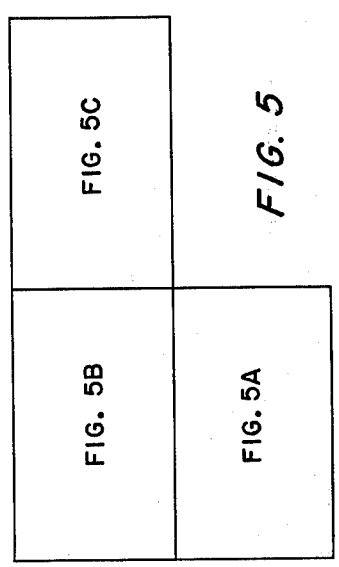
FIG. 5C
FIG. 5

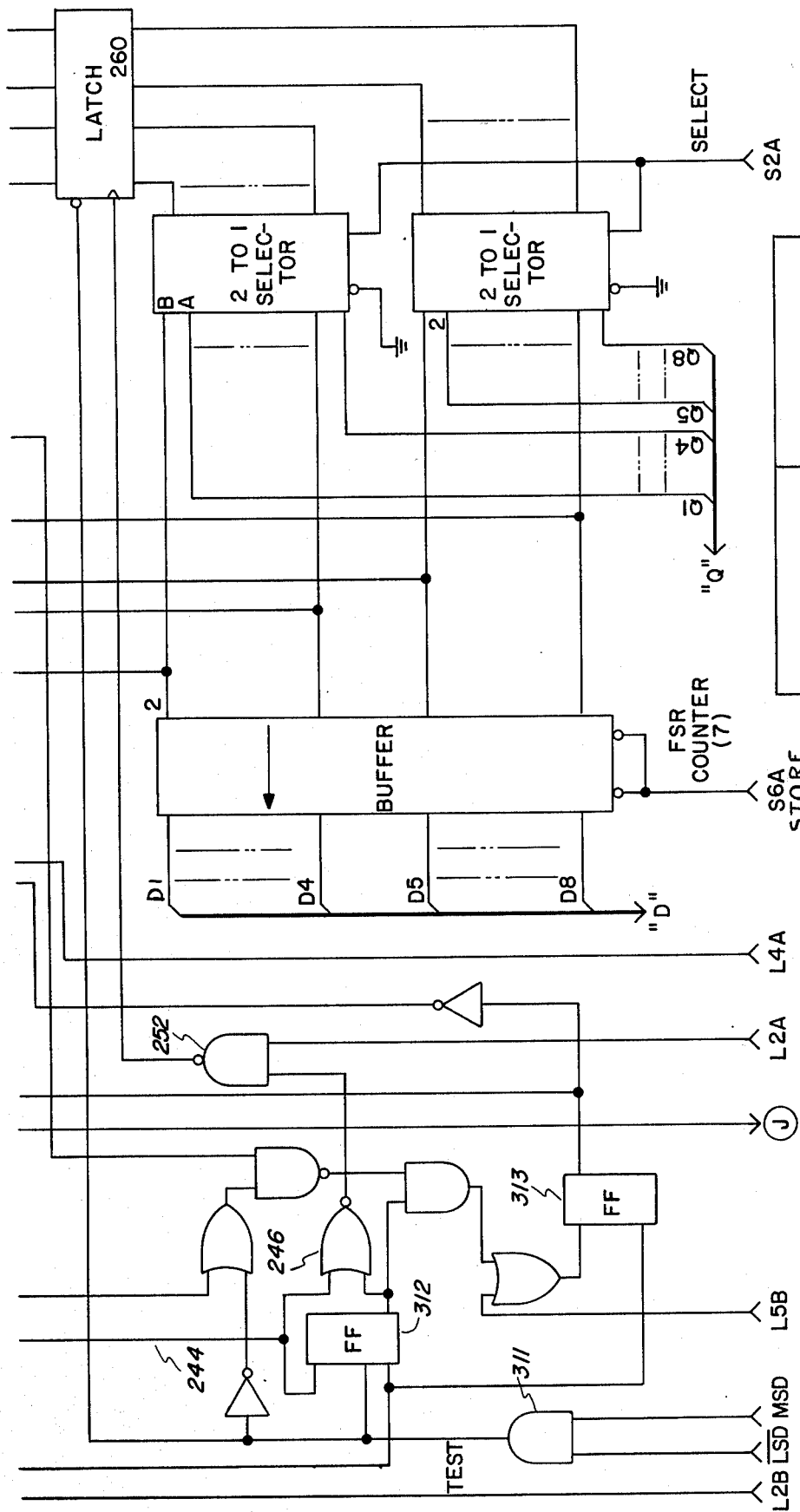

DIGITAL RING CONTROL SYSTEM FOR DIGITAL MULTIPLEXER

BACKGROUND OF THE INVENTION

Digital multiplex systems are well-known. Such systems are also known as subscriber loop multiplexers, remote subscriber multiplex terminals or remote line switches. These systems provide carrier communication service between a central office and a group of subscribers associated with one or more remote terminals, the central office being coupled to the terminals over a multiple channel line. For example, my U.S. Pat. Nos. 4,001,514 issued Jan. 4, 1977 and 4,021,618 show one such basic system using a 32 channel line with one form of delta modulation as the coding language.

In systems of this type, a call from the central office is detected in the C.O. terminal unit line circuits, these being a line circuit in the C.O. for each line being served. The call signals are digitized in the line circuit for transmission over the span line during a channel time slot allocated by a concentrator.

In the system shown by the cited references, separate line units each are employed receptive of a particular type of ring signal. Input ring signals are coded and transmitted in the specific code to a line unit receptive of ring signals of the particular type. In the line unit, the signals are decoded and cause a ring output of the designated type to be transmitted.

SUMMARY OF THE INVENTION

The present invention is directed to an improved ringing arrangement within a digital multiplexing system. Within the system, a time division path is completed from the line circuit reprsenting a calling line, the line circuit being at the central office communicating over a span line to a line circuit at the remote terminal representing the called line. The time division path is completed after a busy test has been made and the called line is found to be available.

Ringing current of the type for which the called line is equipped is generated in analog form at the Central Office and sent to the C.O. line circuit for the called line. The line circuit detects the type of ringing and converts the detected type of ring into a digital code signal indicative of that type of ring. The code signal is inserted into the channel allotted to handle the call and re-coded for transmission on the designated channel. At the remote terminal, the received signal is preliminarily decoded and forwarded to the line circuit for the designated channel. In the line circuit, the received signal is decoded and operates a relay to initiate analog ring output of the type detected in the C.O. line circuit.

Within the described arrangement, ringing may be divided ringing over either the tip or ring lead with simultaneous revertive signalling, superimposed ringing or frequency selective ringing over either the tip or ring lead.

When a called line answers by going off hook, an indication of this condition change is sent to the system controller by means outside the scope of the present (ringing network) invention. The system controller acts on the changed condition indication to inactivate the ringing detection through suitable gating circuitry.

It is therefore an object of the invention to provide an improved ringing control arrangement for use in a digital multiplexer system.

It is a further object of the invention to produde an improved line circuit for use in the central office, the line circuit being a universal type which can accept and detect analog ringing signals of any of a plurality of types and produce a digital output code indicative of the type of ring signal received.

It is a further object of the invention to provide a digital code control circuit which responds to a digital signal indicative of a type of ringing and to produce an output signal in digital form for operating one of a group of output relays in a mode consistent with a desired analog ring signal. The control circuit or interface circuit serves all channels of the multiplexer system sending signals over each or all channels in multiplexed format.

The present invention has as another object the provision of a plural channel ring control arrangement for a digital transmission system which simulates the wave forms of ringing data to produce relay operating data indicative of various ringing signals over respective channels for operating designated relays to reproduce the desired output ring control signals.

Other objects, features and advantages of this signalling detection arrangement are as follows:

(a) The signalling detector design is of common design for all line units. This common design allows a line circuit to handle more ringing schemes, thereby minimizing the need for inventory of different line circuit designs.

(b) Signalling detectors are of simple design containing no decision-making, timing elements. Experience has shown that many problems in the field result in the changing of signalling detector time constants in order to handle unforeseen ringing conditions. If signalling problems appear on an installation using the present design, either the digital ring control circuit design can be changed or control processor software can be modified.

(c) On a 24 channel multiplex system such as the one shown in FIG. 1, a maximum of 24 of the 120 lines available can be attempting to signal at any one time. This signalling scheme removes circuit complexity from the 120 line level and implements it in a one per-system level within a common digital ring control circuit that can handle signalling on 24 channels simultaneously.

(d) The complexity of the signalling detectors located on the line circuits is reduced. Because of the large number of identical line circuits in a fully equipped system, this lack of complexity can be lead to a significant saving in original cost and in maintenance costs. The digital ring control circuit is fabricated on a single board using non-critical digital logic comprised of off-the-shelf circuits. This approach replaces a large quantity of critical analog components spread over many line units. With these line circuits, the reliability of line circuits is increased and production testing is simplified.

DETAILED DESCRIPTION OF THE DRAWINGS

Figure 1:
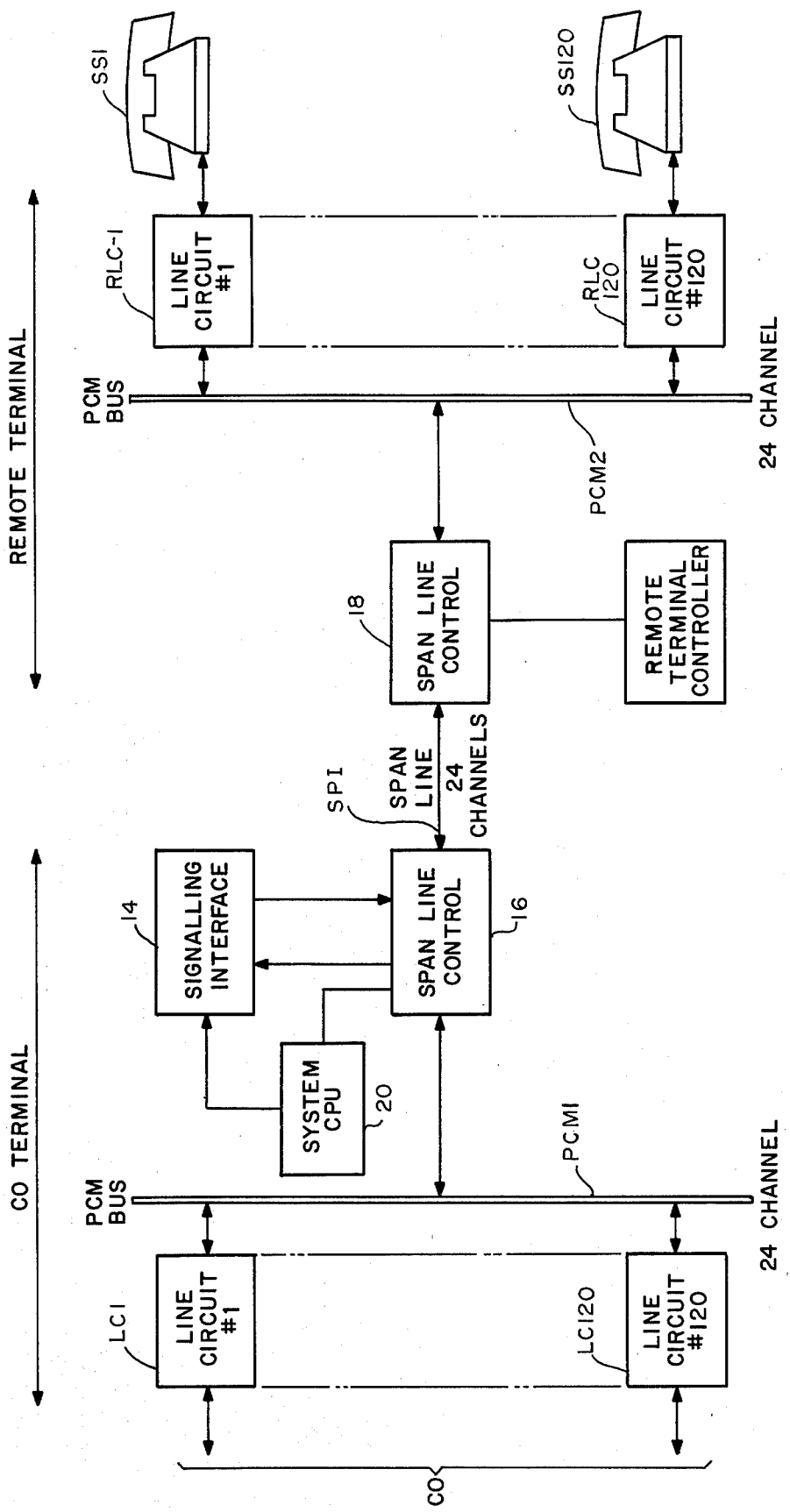
FIG. 1 is a block diagram of a digital multiplexer arrangement employing my invention.

The block diagram of FIG. 1 is similar in concept to the block diagram of the system shown by my previously cited U.S. Pat. No. 4,001,514, that system being for a 32 channel system using a form of delta modulation as its coding.

In a system of this type, the Central Office (C.O.) terminal includes a line circuit individual to each line served by the multiplexer operation. In the embodiment shown, there are 120 lines each represented by a line circuit LC1–LC120 in the C.O. The line circuits detect signals, which may be analog signals, from the C.O. addressed to their line and act on these signals by forwarding data to the system processor (CPU) for call completion, signalling and supervision. The line circuits communicate over a PCM or speech bus, the bus being arranged for 24 channel, PCM multiplex signals. Over these channels PCM1, speech and signalling data is transmitted from a C.O. line circuit. A span line control and timing circuit 14 provides timing and controls for bidirectional transmission of speech, signalling and control data across a span line SPI which may be of the well-known T1 or T2 types. For such span lines, 24 channels are used between the central office and the remote terminal. At the remote terminal, the span line is terminated at a span line timing circuit 18 for timing control of the local 24 channel PCM bus. The local bus PCM2 is synchronized with the C.O. timing circuits and is coupled in multiple to the 120 remote terminal line circuits RLC1–RLC120, each line circuit having access to a particular subscriber station SS1–SS120 complete with telephone instrument. Within the line circuits, signals are converted to analog for the line subscriber.

Within a generally known circuit of this type, I have provided a signalling or ring control interface 14 in the Central Office coupled to the span line timing control 16 and the system CPU 20. This interface accepts ringing signals in digitized form from the line circuits and re-codes the signals for transmission over the span line to the remote exchange to cause the output of ringing signals of designated types to the instrument or instruments of the line being rung.

Figure 2:
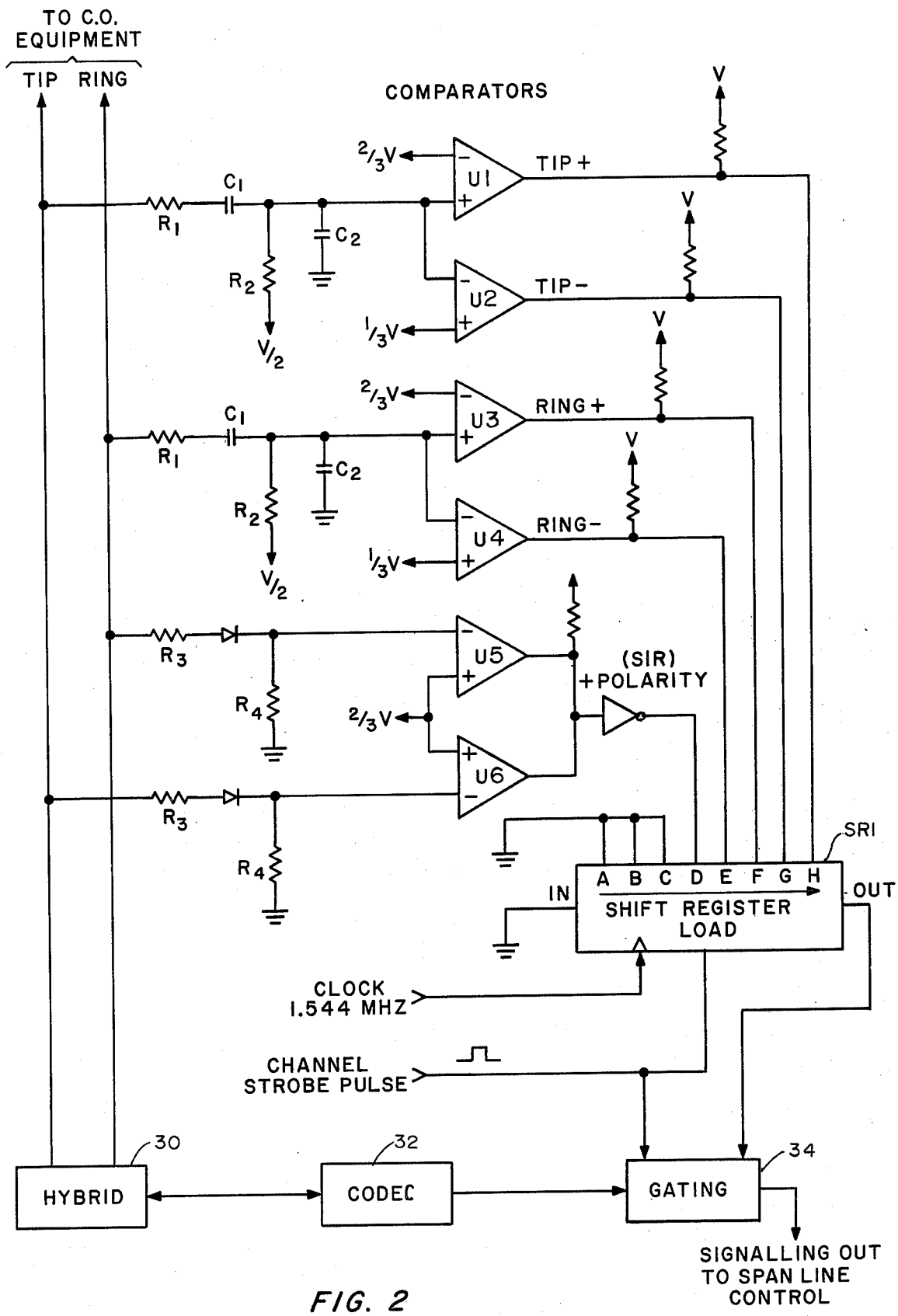
FIG. 2 is a block diagram of a typical C.O. line circuit of the type shown in FIG. 1.

In FIG. 2, I show the ring detector portion of a line circuit LC1 within the C.O., the remainder of the circuit being shown generally by blocks. A hybrid block 30 is shown having access to the tip and ring leads to the C.O. switching equipment for the receipt of analog signals from the Central Office. The hybrid feeds a bidirectional codec 32 for A/D and D/A conversion, the codec being coupled to suitable gating for switching either the speech and control path of the hybrid to the span line or the NAND gate output from the ring detectors.

The ring detection portion of the line circuit includes a plurality of operational amplifiers U1–U6 (used as comparators) to perform a signal detection function. The signalling detectors located on the line circuits (FIG. 2) are simple voltage threshold detectors. Each amplifier has one input coupled to a voltage reference, the other input to the tip or ring lead. A ring signal appearing on the tip lead is scaled down to an appropriate value by filter network R1, C1, R2, C2 for the plus input to comparator U1. All voltages more positive than $\frac{3}{8}$V are detected by comparator U1. Voltages more negative than $\frac{1}{8}$V (compared with reference V/2) are detected by comparator U2. When an AC ring signal is on the tip input, alternating outputs of amplifiers U1 and U2 appear on leads H and G of the shift register SR1 representing the peaks of the positive and negative half cycles of the ringing voltage. Comparators U3 and U4 perform a similar detecting function on a ring signal appearing on the ring input to produce outputs on leads F and E of the shift register SR1. Comparators U5 and U6 are comparators used to detect the positive voltage peaks when 20 Hz AC is superimposed on +48 V on either tip or ring during superimposed ringing (SIR) to produce output on the D input to the shift register. The outputs of the comparators are loaded into the shift register which inserts the information in serial form into the assigned channel time slot during the subscriber ON hook condition through gating 34. The shift register outputs are strobed by channel pulses from the system clock.

Figure 3:
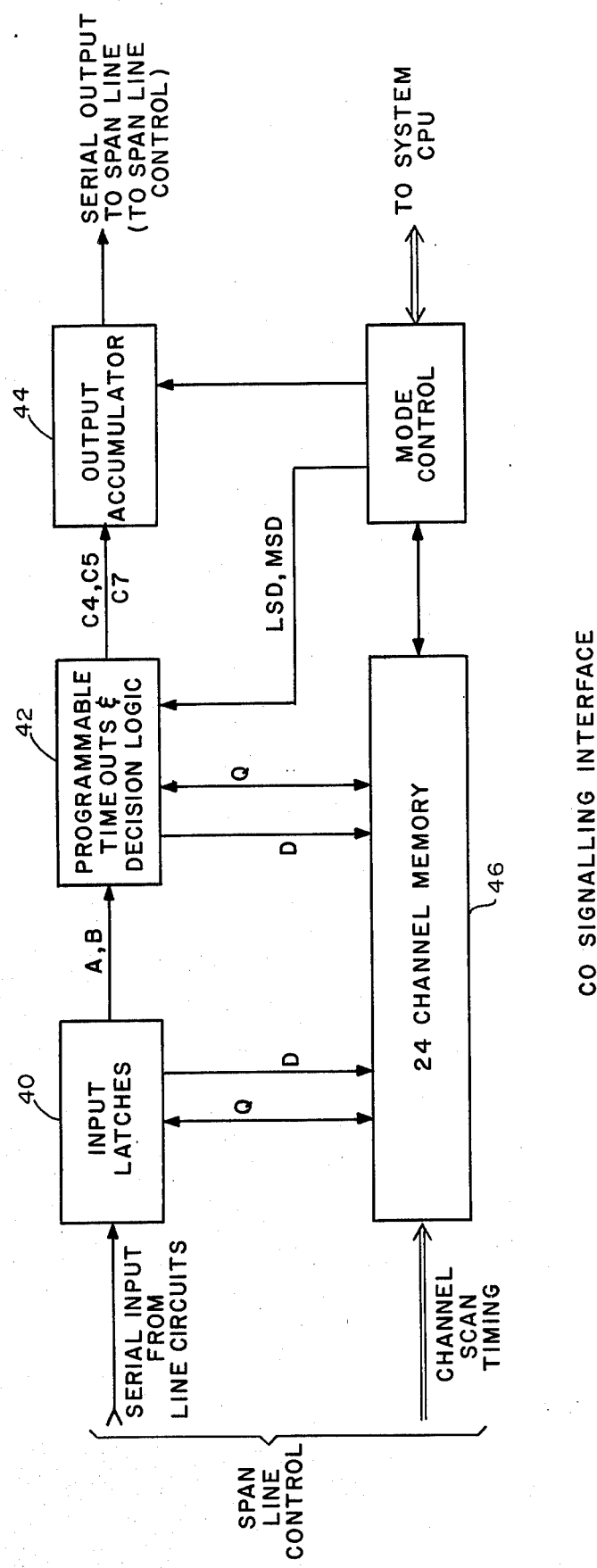
FIG. 3 is a block diagram of the signalling control or interface circuit of FIG. 1.

The C.O. signalling interface or ring signal control circuit is shown by the block diagram of FIG. 3. In that figure, leads representing the serial input of data from the line circuit shift register such as SRI via transmit span line control 16 feed the input latches 40. The output of the ring signalling detectors (FIG. 2) is entered into the input latches 40 of the signalling interface. The latches act to discriminate between single polarity noise transients and valid ringing signals. The latches are designed to pass signals that are alternating in polarity to produce a single output pulse for each polarity change. The output pulses are sent to the block 42 designated programmable timeouts and decision logic. In this block, the programmable timeouts use the polarity change information to reconstruct the ring envelope for transmission. A separate timeout is used to measure and reproduce the incoming frequency during frequency selective ringing. The output accumulator 44 receives the timeout outputs and positions the timeout outputs in the revised bit positions within the assigned channel time slot in order to operate appropriate relays located at the remote terminal within an addressed remote line circuit.

In addition, the interface of FIG. 3 includes a 24 channel memory 46 carrying permanent channel assignments from the channel scan timing for storing an indication of the condition of each channel for controlling the decision logic 42 and the mode control 48.

The mode control circuit 48 is operated by the system control processor 20. The mode control optimizes the timeout and decision logic for the required ringing mode (bridged, divided, superimposed or frequency selective).

Figure 4:
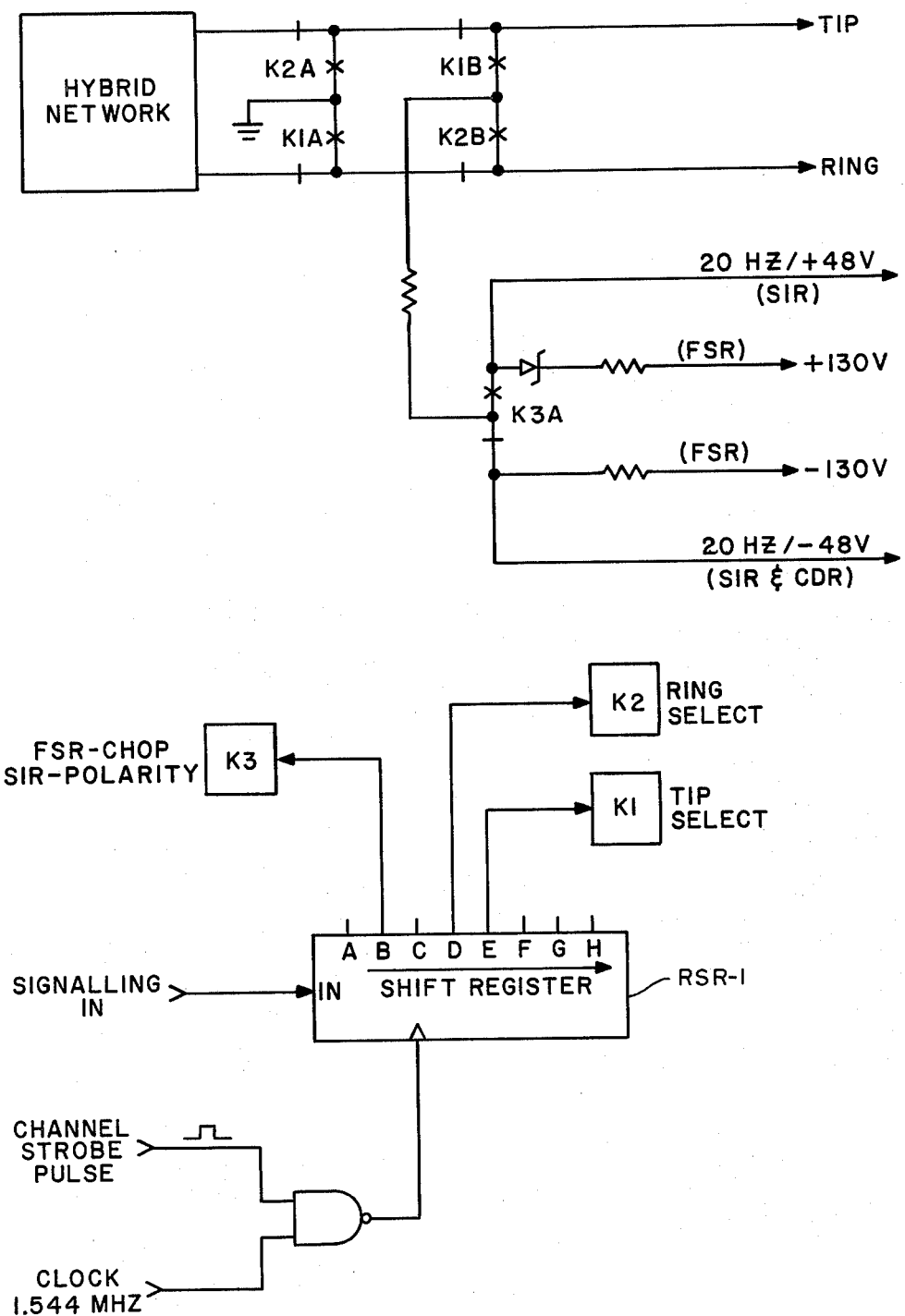
FIG. 4 is a block diagram of the ring select portion of a remote terminal line circuit of FIG. 1.

In FIG. 4, I show the relevant portion of a line circuit RLC-1 at the remote terminal, the portion shown being that used to supply ringing to the line. Signalling input from the remote terminal span line control 18 is fed to the input of the line circuit shift register RSR-1 of an addressed line circuit in the form of a bit during the designated time period of the eight bit word as the shift register is strobed at the 1.544 MHz rate. A bit received during the B or second time period acts to energize the K3 relay for superimposed ring, frequency selective ringing (FSR). On energization, this relay operates its contacts K3A to prepare a path for ringing of the desired type to either the ring or tip lead. A bit received during the D or fourth time period will energize the K2 relay to operate contacts K2A and K2B to supply ringing current to the ring lead. If contacts K3A had also been operated, then the resultant ringing would be FSR or SIR ringing sent to the ring lead.

In a like manner during the fifth or E time period, a bit entering the shift register will cause operation of the K1 relay to close a path through contacts K1A and K1B to the tip lead for ringing signals.

Figure 5A:
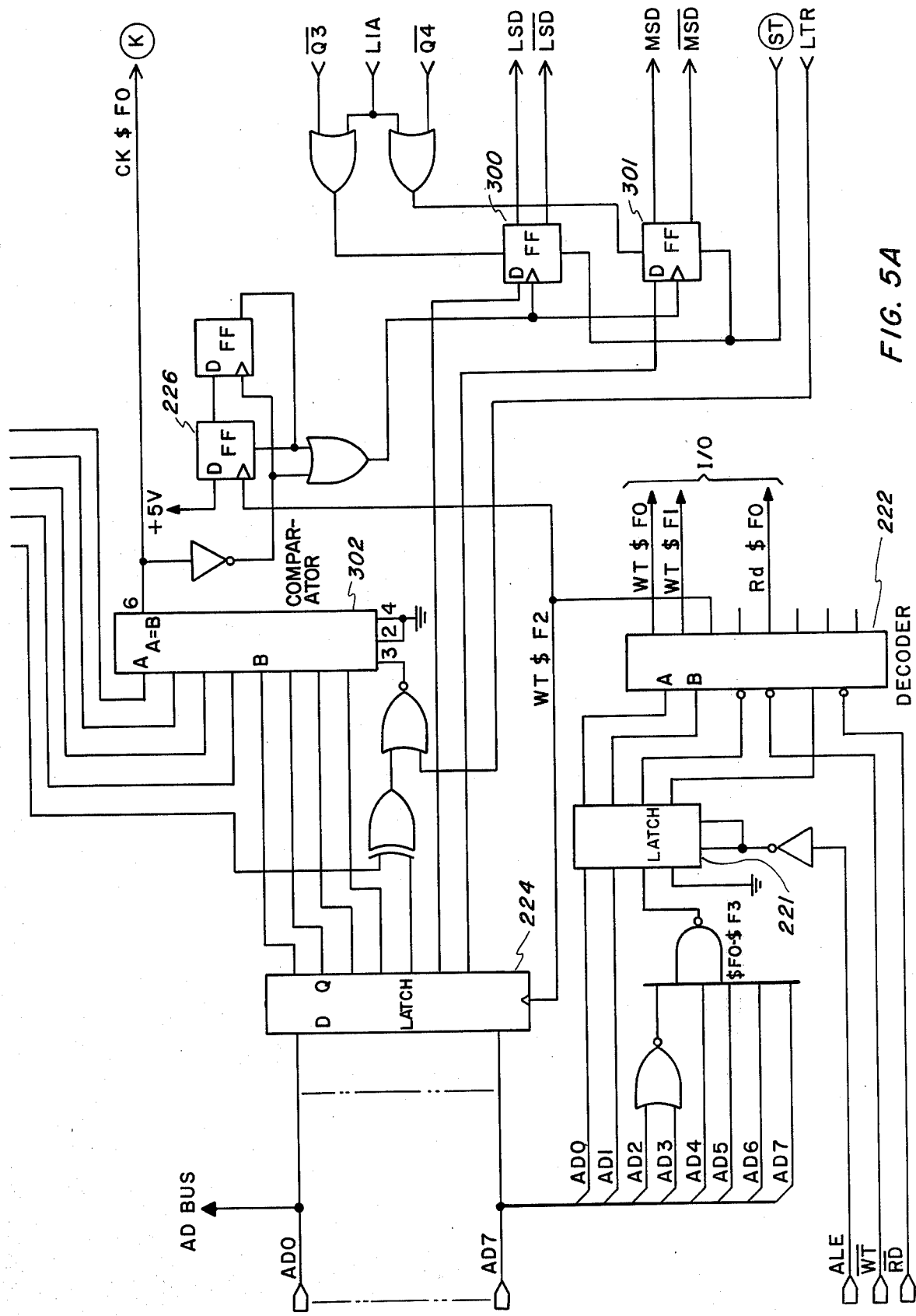
FIG. 5 is a block diagram showing the arrangement of FIGS. 5A, 5B and 5C showing the memory and multiplexers of the signalling interface circuit herein.
Figure 5B:
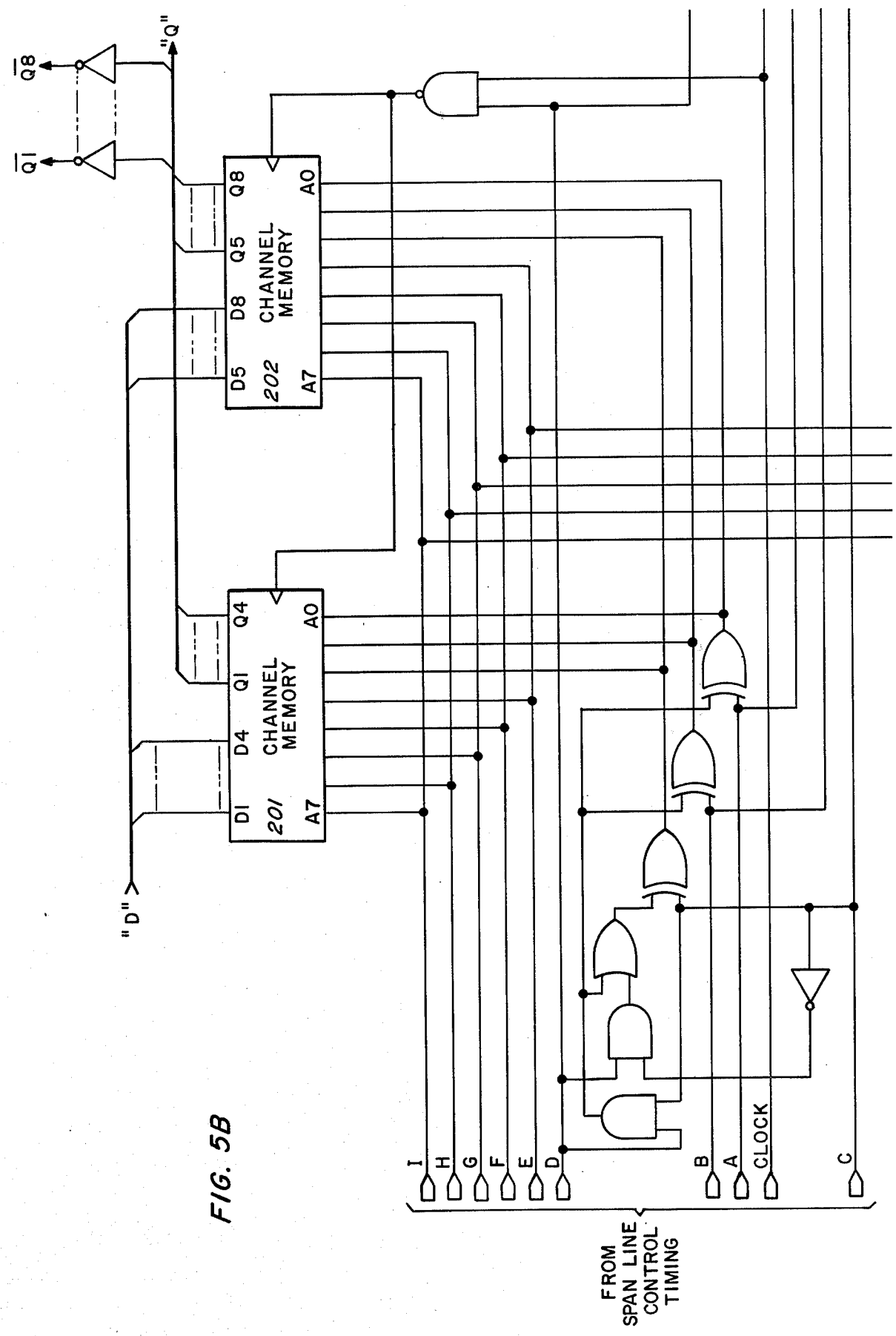
Figure 6A:
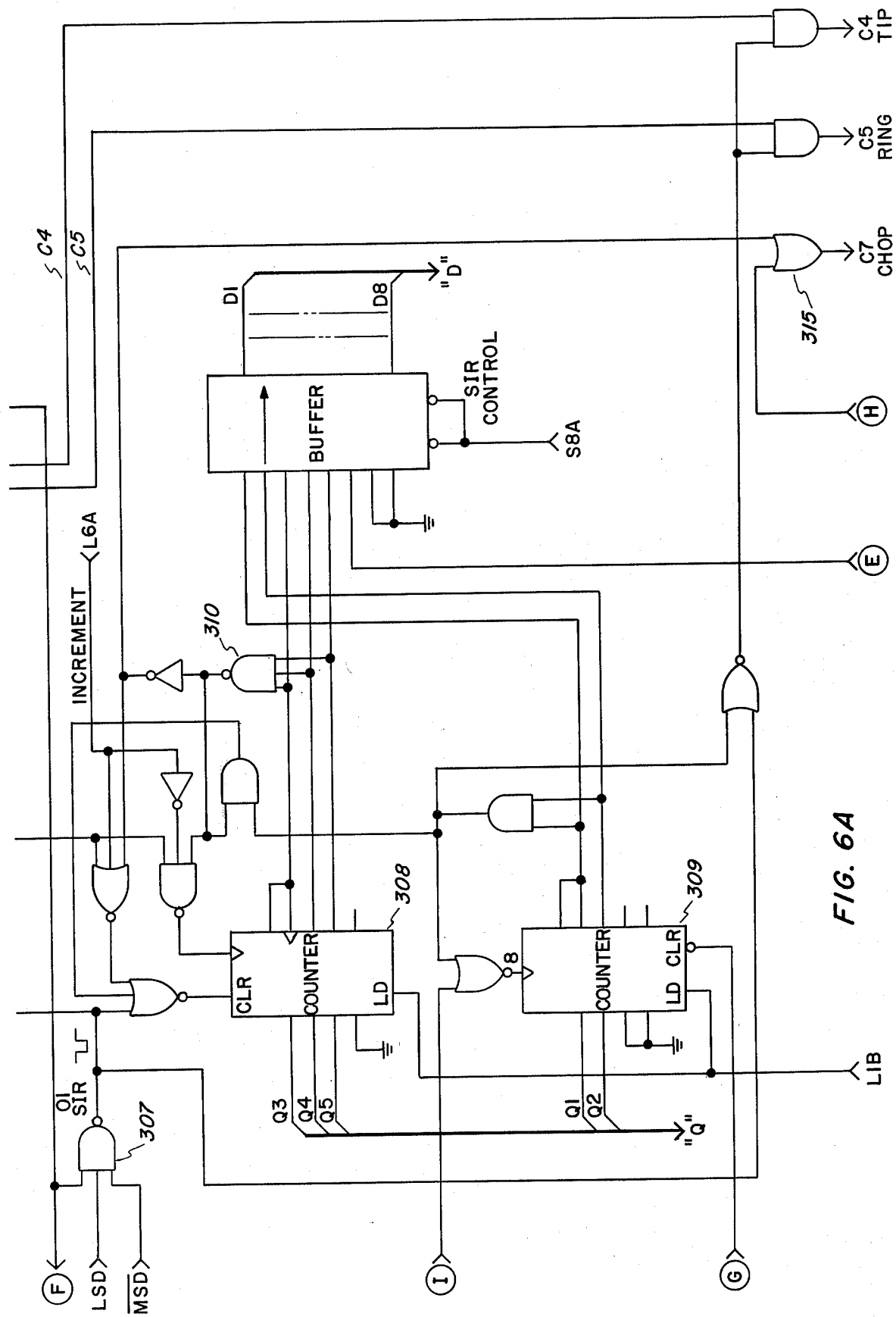
FIG. 6 is a block diagram showing the arrangement of FIGS. 6A, 6B and 6C to form a logic portion of the signalling interface circuit herein.
Figure 6B:
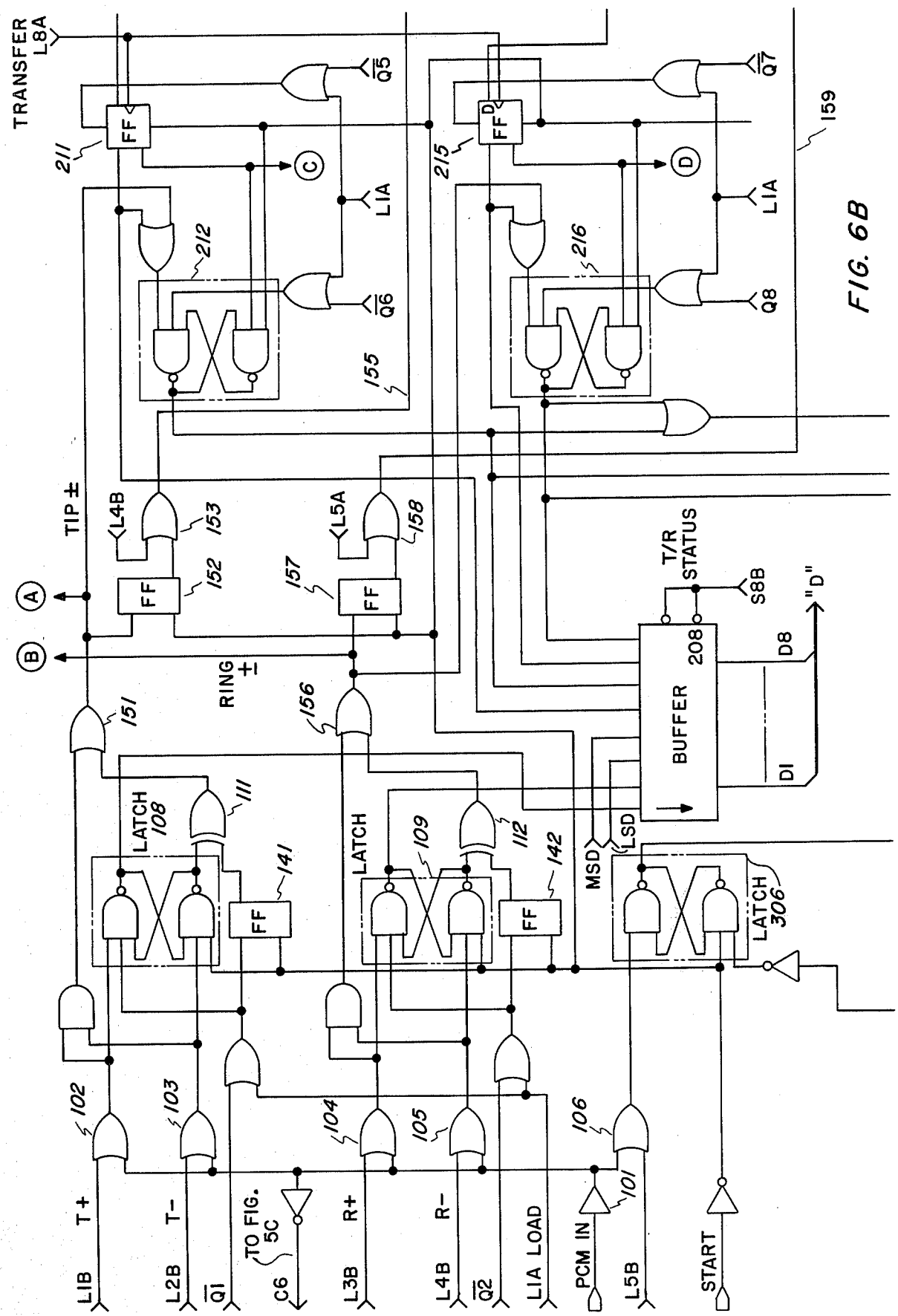
Figures 6, 6C:
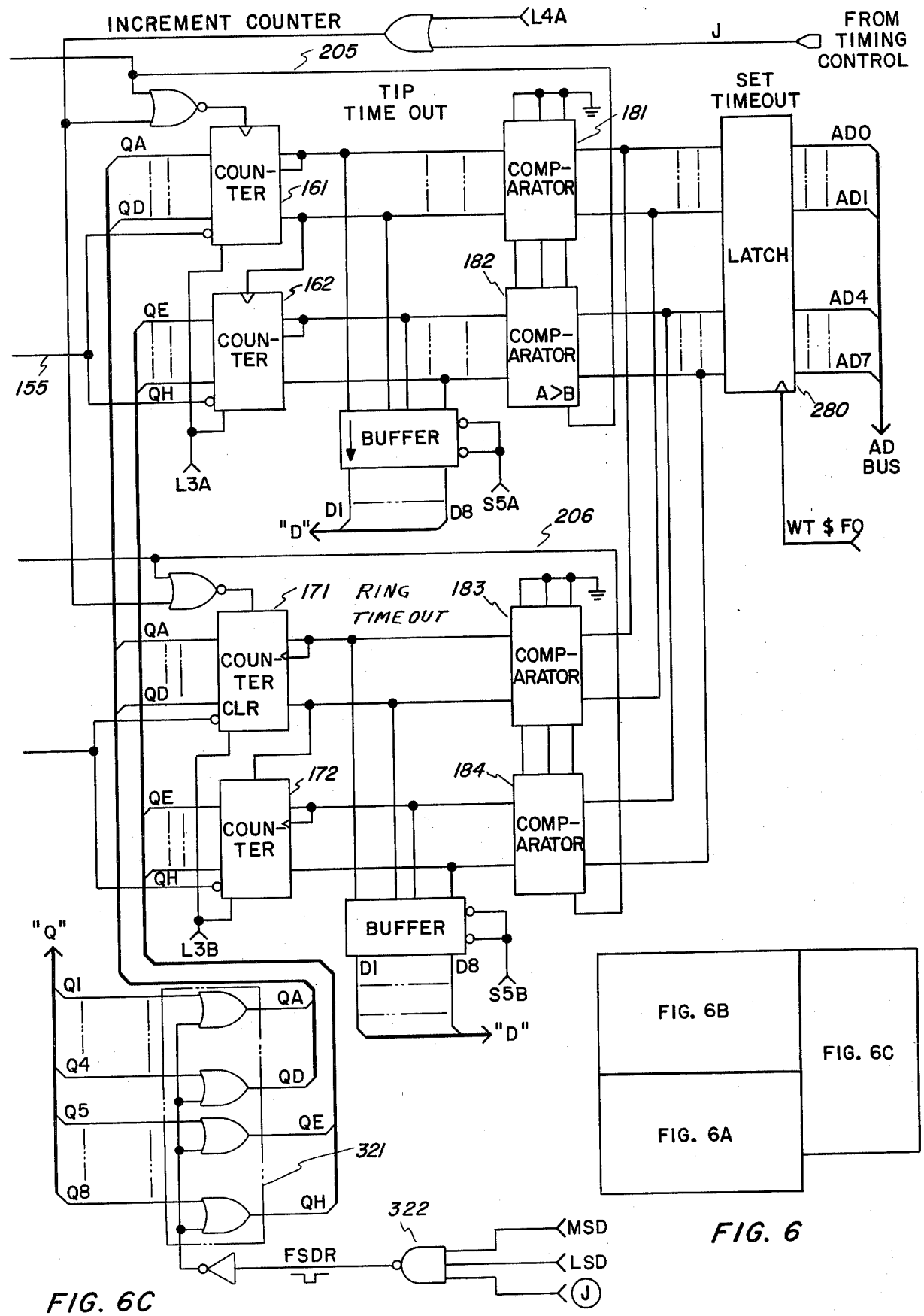

In FIGS. 5-7, I show in greater detail the combination of circuits constituting a ringing control circuit or interface, shown as a box in FIG. 1, and in block form in FIG. 3. The components shown in FIGS. 5-7 are off-the-shelf items which are identified by functional title in the figures. Within these figures, input to the interface in serial PCM form is received from the C.O. line circuits via the transmit portion of the span line control over the lead designated PCM-In in FIG. 6B. This input lead is connected via a buffer 101 to parallel OR gates 102-106, in turn inputting a pair of input latches 108 and 109. These latches make a last look, polarity comparison with respective flip-flops to pass signals through respective exclusive OR gates 111 and 112 representing the respective tip and ring leads.

The timing and order of loading of data from the latches 108 and 109 is determined by the multiplexers 131-134 (MUX) of FIG. 5 in response to timing signals received from the transmit portion of the span line control, the MUX's being part of the timing logic for the interface. The first two of these multiplexers provide output strobe pulses L1A through L8A and L1B through L8B. In this way, each time period 1-8 of an 8 bit PCM word is divided into two intervals, an A interval and a B interval. The output strobe pulses clock the loading of signals in the interface in the word pattern received from the C.O. line circuit. In the interface, these words are translated or recoded. The second pair of multiplexers 133, 134 control the storage of data in the recoded pattern output of the interface through leads S1A-S8A and S1B-S8B.

For a channel over which ring signals are to be sent, the interface receives ring signals in the form of square wave pulses of one polarity during bit periods 1 and 2 for tip lead ringing and during bit periods 3 and 4 for ring lead ringing. (See Input line of Table A).

maintained in the flip-flops 141 and 142 to produce leading edge detection at the output of the exclusive OR gates 111 and 112 representing received bits. The output of the leading edge detection occurring during time periods 1B to 4B is stored in flip-flops 152 and 157 and then is clocked during time periods 4B for tip and 5A for ring to clear the respective counters 161, 162 and 171 and 172 (FIG. 6B) during a time when the counter outputs are valid. The path to counters 161, 162 may be traced through OR gate 151, flip-flop 152, OR gate 153 and lead 155 during the 4B interval. The path to counters 171, 172 may be traced through OR gate 156, flip-flop 157 and OR gate 158 for transmission of a bit pulse over lead 159 during the 5A interval. The counters 161, 162, 171 and 172 are 4 bit counters arranged to operate as a retriggerable monostable whose output is compared with received information from the central processor. The desired time out value is received on the AD bus from the processor and fed to multiple latches shown as box 280. Data from the latches is fed to comparators 181-184. The output of the comparators 181-184 is fed to the delay circuits 211, 212, 215, 216 that control signalling to the remote terminal. The comparators compare the programmed timeout delay received from the system processor over the AD leads against the count of present information for a particular channel as has been retrieved from the channel memory (201, 202 in FIG. 5B) over the Q leads. The time and condition is fed over leads 205 and 206 to the T/R status buffer stage 208 (FIG. 6B) for the purpose of storing channel status conditions. The timeout signal 205, 206 also inhibits operation of the counters once a timeout has occurred. During every half cycle transition of the incoming ring signal appearing at 155, 175, the counters are reset. While the ring waveform is present, the counter will not time out because the following half cycle will cause it to reset to zero and start counting from zero. When the ring burst terminates, the timer will count up to the value stored in latch 280 and timeout. In this manner, the envelope of the ring burst on tip and ring will appear at 205 and 206 respectively. The path over lead 205 includes flip-flops 211 and 212 and that, through lead 206, includes flip-flops 215 and 216. The ring control outputs of flip-flops 212 and 216 are leads C4 and C5 for tip and ring respectively. These leads to the marked inputs to selector 220 of the accumulator are used to energize the K1 and K2 relays.

By this arrangement, the duration of a ringing signal wave is counted as a measurement of the frequency of

TABLE A

| BIT | 1 | | 2 | | 3 | | 4 | | 5 | | 6 | | 7 | | 8 | | L = Load S = Store |
|---|---|---|---|---|---|---|---|---|---|---|---|---|---|---|---|---|---|
| | A | B | A | B | A | B | A | B | A | B | A | B | A | B | A | B | |
| WORD 1 | L | | | | | | | | | | | | | S | | | Tip/Ring Status |
| 2 | | L | | | | | | | | | | | | S | | | Superimposed Ring Control |
| 3 | | | L | | | | | | | | | | S | | | | Frequency Selective Ring Latch |
| 4 | | | | L | | | | | | | | | S | | | | Frequency Selective Ring Control |
| 5 | | | | | L | | | S | | | | | | | | | Tip 63 MS |
| 6 | | | | | | L | | | S | | | | | | | | Ring 63 MS |
| 7 | | | | | | | L | | | S | | | | | | | FSR Counter |
| 8 | | | | | | | | L | | S | | | | | | | NOT USED |
| INPUT BIT | T+ 1 | | T− 2 | | R+ 3 | | R− 4 | | P+ 5 | | DIR 6 | | 1 7 | | 1 8 | | |
| OUTPUT BIT | 1 1 | | 1 2 | | 1 3 | | T 4 | | R 5 | | DIR 6 | | Chop 7 | | 8 | | |

The latches 108 and 109 (FIG. 6B) act to compare the received square waves against the last look indication an external timing signal to define the ring burst duration for the ring signal to be generated at the remote terminal. In this way, the envelope of the ring signal is generated in the interface for transmission over a span line to the designated relay in the remote line circuit.

The initial signal concerning a ring input is loaded into the interface circuits during the early bit periods of a data word. Decisions on the loaded bit are made during the intermediate bit periods of a word and the resulting data bits are available for transmission to the span line during the latter bit periods of a word. The results of the decision making are stored in the channel memories (201, 202) allowing all of the circuit functions to be timeshared between 24 channels. The serial output of bits are sent to the span line from the selector 220 (FIG. 5C).

The accumulator function is performed by a multiple input, single output data multiplexer transmitting serial bits on the PCM line to the span line control and timing.

In a system using the standard 24 channel PCM timing, each channel employs 5.2 microseconds to send out its eight bits. Within the interface, incoming bits received during the first five periods act to initialize the loading of bit data from the ring detectors to the portion of the interface logic circuit which may be termed a re-coder or translator. The bit periods are divided into two intervals, an A period and a B period to enable eight loading intervals and eight storage intervals within an eight bit period. To signal the various ringing modes available, seven data words are employed, the words being loaded during the 1A–4B period and stored during the 5A–8B periods. This timing control is shown by the chart of Table A. In that chart, I show the eight possible words used for ring control and the time period used for loading data bits into the interface circuit and for storing the data for each of the possible words. Output signals are transmitted only during periods 4–7, as determined by selector 220 (FIG. 5C).

To define various types of ringing, signals are received on the AD0 through AD7 leads (FIG. 5A) from the processor. These signals contain address information multiplexed with data information. These signals are fed into latch 221 to address the ringing port information labeled $F0–$F3 using the Address Latch Enable (ALE) signal. Also received from the processor are the Read (RD) and Write (WT) indications fed to decoder 222. Only four of these ports are used Rd$F0, WT$F0, WT$F1 and WT$F2, these being indicated by leads from decoder 222. The mode of ringing on lead WT$F2 is sent to latch 224 and flip-flop 226. This causes the data information appearing on AD0 to AD7 to be loaded into mode control flip-flops 300, 301. Latch 224 also contains channel information causing a strobe pulse to appear on CK$F0 lead during the selected channel time period via comparator 302. For divided ringing or superimposed ringing, the frequency to be sent may be 20 Hz. For FSR ringing, the ring frequency to be sent is indicated to the processor in an eight bit code. The Rd$F0 indication sent by the lead in FIG. 5A to FIG. 7B causes the frequency value for the channel selected by CK$F0 that is stored in eight bit latch 231 to be sent to the processor.

The channel memories 201 and 202 (FIG. 5B) may be bipolar memories each with capacity of 256×4 bits, the memories multipled to 256 words of 8 bits length. The memories receive channel timing on leads A to I and the clock lead. Data storage input to the memories is by the D bus and storage output is by way of the Q bus.

Figure 7A:
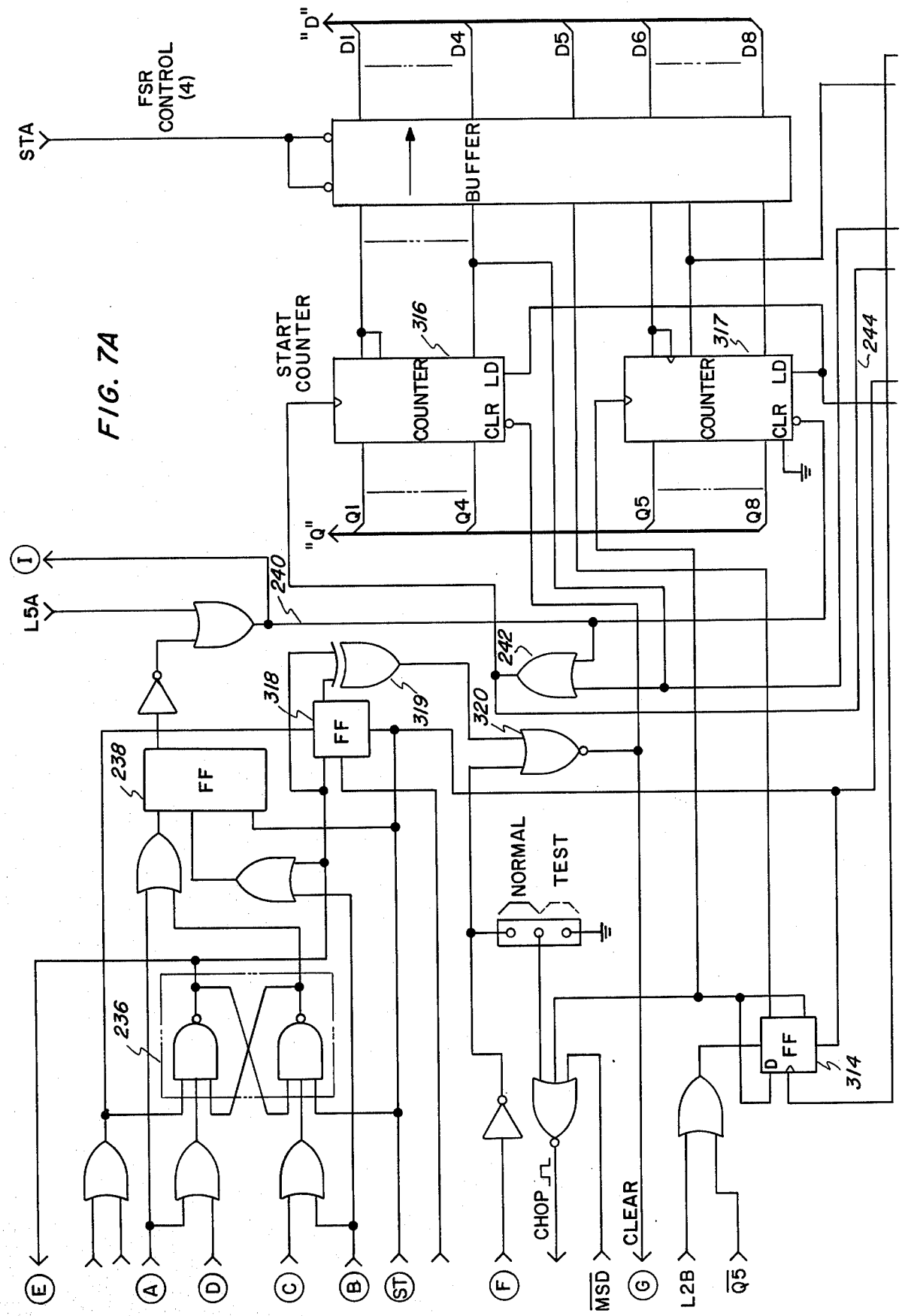
FIG 7 is a block diagram showing the arrangement of FIGS. 7A, 7B and 7C to comprise the output portion of the signalling interface circuit herein.

During this time interval 2A, signals from the tip and ring lead OR gates 151, 156 (FIG. 6B) as output of latches 108 and 109 are sent on leads A and B to FIG. 7A to the tip/ring select flip-flop 236. The signals sent provide leading edge detection of received data. The leading edge signals are stretched for the channel time slot duration by flip-flop 238 through an OR gate and appear in time slot 5A on lead 240. A path exists through OR gate 242 and lead 244 and OR gate 246 (FIG. 7C). When this signal coincides with a 2A pulse during time slot 2A, AND gate 252 is pulsed to latch the data from FSR counter 267 and 269 into latch 260. This latch is an eight bit latch, loaded during interval 2A to initialize the FSR data in the channel interval.

Figure 7B:
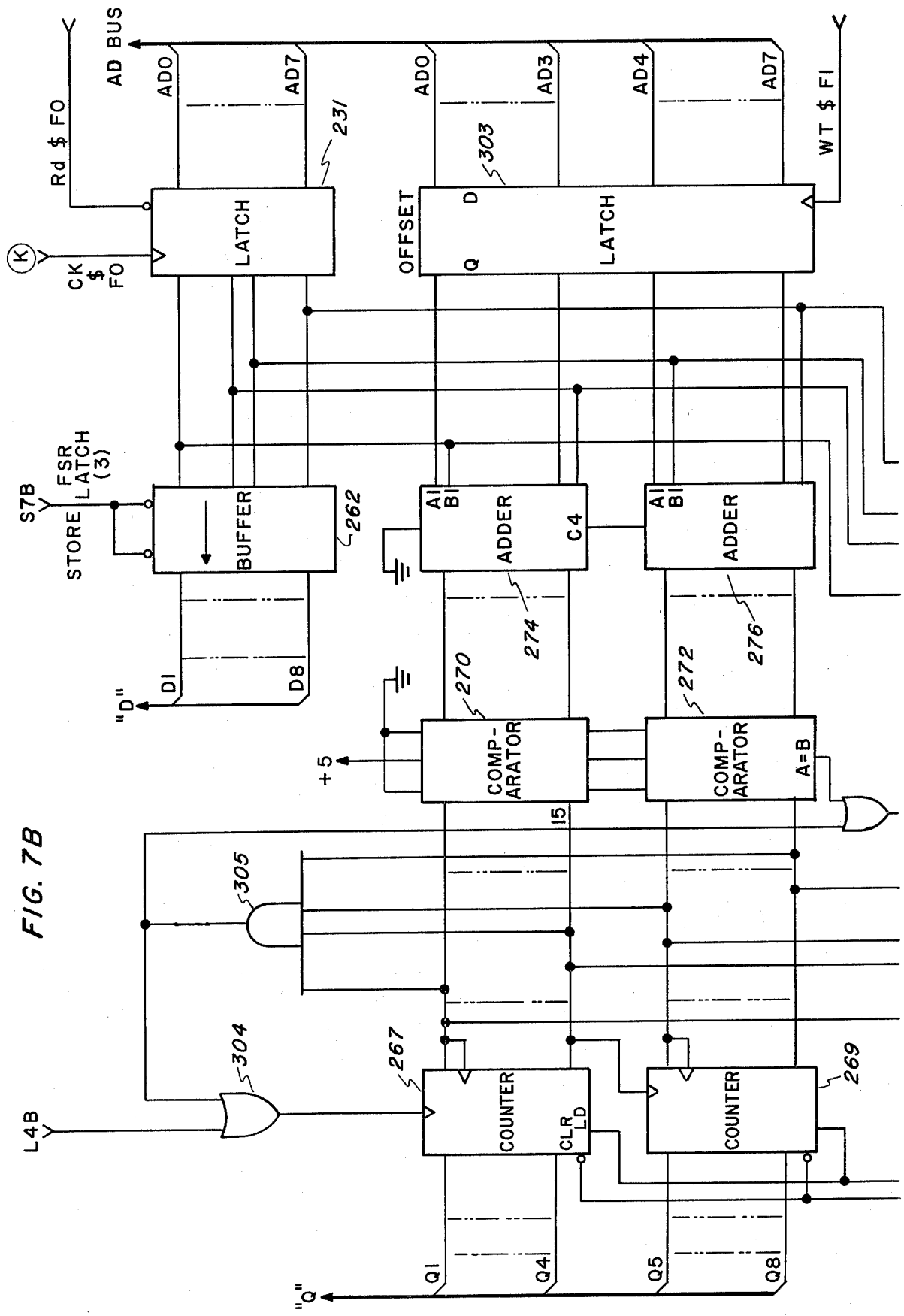

The loaded information is stored during interval 7B in buffer 262 (the FSR latch output buffer) of FIG. 7B. This data forms the basis for a comparison between the address received and the digitized data from an actual received signal.

The output of the Q leads into counters 267 and 269 in comparators 270 and 272 is compared with data from latch 260 fed through adders 274 and 276, the comparison occurring during the L5B period.

The WT$F0 signal from FIG. 5A is fed to latch 280 of FIG. 6C to set the timeout or end of envelope comparison in motion, called setting delay timeout.

The WT$F1 indication is fed to octal latch 303 to set the offset in the frequency counter (FIG. 7B).

The ring mode is set by the WT$F2 signal as noted previously (FIG. 5A).

Essentially, signals are clocked in at the clock frequency of 8 KHZ. The digital representation of the desired frequency is counted and compared against a representation from the memory. When comparison is achieved, the digital data is read out and reset.

Ringing for the various channels occurs during the time slot allocated to that channel and thus, a plurality of channels may be simultaneously monitored and rung by the interface circuit shown.

Table B shows the command format that is decoded by the arrangement shown in FIG. 5A. The read/write port functions are selected by decoder circuit 222. As mentioned previously, RD$F0 allows the processor to read the value stored in latch 260 (FIG. 7C) in a specific channel marked by signal CK$F0 by means of latch-buffer arrangement 231 (FIG. 7B).

TABLE B

| SIGNALLING INTERFACE COMMAND FORMAT | | |
|---|---|---|
| PORT | Rd/Wt | FUNCTION |
| $F0 | Rd | READ FSR FREQUENCY |
| $F0 | Wt | SET DELAY TIMEOUT |
| $F1 | Rd | — |
| $F1 | Wt | SET OFFSET (FREQUENCY COUNTER) |
| $F2 | Rd | — |
| $F2 | Wt | SET MODE (FSR,DVR,SIR,TEST, CHANNEL No.) |
| $F3 | Rd | — |
| $F3 | Wt | — |

WT$F0 allows the processor to set a time delay value in latch 280 for the ring burst envelope generating monostable circuit (FIG. 6C), as previously mentioned.

WT$F1 allows the processor to offset the FSR counter frequency for test purposes by entering a value in latch 303 (FIG. 7B). The contents of 303 are added to the contents of latch 260 (FIG. 7C) in Adder circuits 274 and 276 to generate a frequency which is offset in value from the actual FSR frequency being detected on the line circuit associated with the channel. While in the Test mode, the FSR counter operates as a processor controlled, frequency programmable ringing generator. In the Test mode, a ring burst of any input frequency appearing on the line circuit is translated in frequency to a frequency determined by the contents of latch 303. This arrangement allows the multiplex system to generate a frequency-stable ringing burst pattern of any selected frequency from below 16 Hz to above 100 Hz, to a frequency resolution that is determined by the 8 KHz system framing rate. The framing signal is connected to FSR counter 267 by means of NOR gate 304. NAND gate 305 prevents counters 267 and 269 from overflowing to zero during ringing conditions which may cause the counter to reach a greater than maximum count.

WT$F2 (FIG. 5A) allows the processor to reconfigure internal arrangements in the Ring Control system by causing Mode control instructions to be stored in latch 224 (FIG. 5A). The bit positions in latch 224 are arranged to define 24 channel time slots as well as four mode control conditions. As mentioned previously, the mode control command is stored in flip-flops 300 and 301 for any selected channel time slot. The WT$F2 signal also triggers flip-flop 226 which loads the mode information stored in latch 224 into flip-flops 300 and 301 during the channel time slot position also stored in latch 224. Flip-flops 300 and 301 contain mode status for each channel and appear, in turn, in each channel time slot at the output of the flip-flops, as the channels are scanned in each timing frame. The outputs of the mode flip-flops 300 and 301 are designated MSD, $\overline{\text{MSD}}$, LSD, $\overline{\text{LSD}}$.

The four modes defined by the conditions of flip-flops 300 and 301 are Divided Ring (DVR), Superimposed Ring (SIR), TEST and Frequency Selective Ring (FSR).

The DVR condition causes the circuitry previously described in FIGS. 6B and 6C to detect the ringing burst envelope and operate Tip and Ring Select Relays (K1 and K2, FIG. 4) located on the Remote Line Circuit via leads C4 and C5 (FIG. 6A). Relay K3 (FIG. 4) does not operate, causing a 20 Hz Ring signal superimposed on −48 V to appear in response to relays K1 and K2, on the TIP and RING leads. The circuitry shown in FIGS. 6B and 6C is duplicated for Tip and Ring Signalling, allowing Simultaneous Revertive signalling during Coded Divided Ringing conditions.

The SIR condition acting on flip-flops 300 and 301 allows the SIR polarity latch 306 (FIG. 6B) to operate in response to SIR polarity detectors U5 and U6 (FIG. 2). The detectors operate in response to positive ringing peaks exceeding a threshold determined by R3, R4 and ⅜V. NAND gate 307 (FIG. 6A) detects the SIR Mode condition in flip-flops 300 and 301. The output of latch 306 is examined by counter 308 for a period of time measured by counter 309 at the beginning of each ring burst. If the output of latch 306 is present for eight consecutive 8 KHz sampling periods, the condition is detected by NAND gate 310 which causes counter 308 to retain the count for the duration of the ring burst. A Superimposed Ring signal positive in polarity is then detected as present and relay K3 (FIG. 4) is operated via output C7 (FIG. 6A), placing a ringing signal superimposed on +48 V on the Tip or Ring lead, selected by relays K1 or K2. If the output of latch 306 is present during less than eight consecutive sampling periods before counter 309 reaches its full count, a Superimposed Ring signal of negative polarity is detected as present and relay K3 (FIG. 4) does not operate, placing a ringing signal superimposed on −48V on the Tip or Ring lead.

The TEST condition in flip-flops 300 and 301 allows counters 267 and 269 to run freely (FIG. 7B), at a frequency determined by the value loaded in latch 303 by the system processor. (WT$F1). The TEST condition is detected in NAND gate 311 (FIG. 7C) and resets latch 260 and FSR control flip-flop 312. The output of the counter appears in pulse form at the output of pulse stretching flip-flop 313. This signal resets counters 267 and 269 and is divided by two at flip-flop 314 (FIG. 7A) to produce a symmetrical CHOP signal which appears as C7 at output selector 220 (FIG. 5C) via OR Gate 315 (FIG. 6A). The chop signal operates relay K3 (FIG. 4) to select between the +130 V and −130 V DC inputs, reproducing the ringing frequency at the TIP or RING leads, as determined by relays K1 and K2.

The FSR condition in flip-flops 300 and 301 allows FSR counters 267 and 269 to measure the incoming frequency and then reproduce this frequency with relay K4 using the methods described for TEST. (Refer to the previous paragraph for the description). The incoming ring polarity change pulses appearing at the outputs of OR gates 151 and 156 (FIG. 6B) operate delay flip-flop 238 (FIG. 7A). At the beginning of the ringing burst, the signal appearing at 240 increments "start" counter 316 via OR gate 247. Counter 316 counts the incoming half cycles of the ring burst at the beginning of the ring burst. During the time that counter 316 is counting, FSR counters 267 and 269, comparators 270 and 272, latch 260 (FIG. 7C) and components 312, 313, 246, 252 and associated gates, determine, the half cycle period of the incoming signal. The measured value of the half cycle period is stored in latch 260. As mentioned previously, this value may be observed by the system processor via latch 231 (RD$FO). During the FSR mode of operation, a zero code is stored in latch 303 (FIG. 7B) by the system processor, causing the counters 267 and 269 to exactly reproduce the incoming frequency.

During the time that the counter 316 is counting, the incoming ring signal is reproduced directly by relay K4 on the Remote Line circuit, via flip-flop 314. When counter 316 becomes full, the value of the half cycle period stored in latch 260 (FIG. 7C) causes the FSR counter circuit associated with counters 267 and 269 to continuously generate the frequency determined by the value stored in latch 260. This generated frequency now operates flip-flop 314 which, in turn, operates relay K3 located on the Remote Line circuit. Relay K3 continues operating at this frequency until completion of the incoming ring burst. When the ring burst is complete, counter 317 begins to count the output transitions of flip-flop 314. This circuit allows the Ring control circuit to stretch the ring burst reproduced by relay K3 by a few half cycles. This stretching compensates for the half cycles lost at the beginning of the ring burst, during the time the ring control circuit was determining if the incoming ring signal is valid.

Flip-flop 318, EXCLUSIVE OR gate 319 and NOR gate 320 detect the presence of an "end of ring burst" condition, causing counters 316 (FIG. 7A) and 309 (FIG. 6A) to be quickly reset so that they may be immediately used to examine a new ring burst. This allows the FSR circuit to accurately reproduce a closely spaced ring burst sequence occuring alternately on the TIP and RING leads of the C.O. line circuit (FIG. 2).

NAND gate 322 (FIG. 6C) detects a FSR mode condition existing in flip-flops 300 and 301 (FIG. 5A). When this condition is detected, NAND gate 322 causes OR gates 321 to load delay counters 161, 162, 171, 172 to their maximum value when the timeout condition occurs on counter 317 (FIG. 7A). The maximum value in delay counters 161, 162, 171, 172 causes comparators 181 and 182 to detect a timeout condition and terminate the FSR ring burst envelope via flip-flops 211, 212, 215 and 216 (FIG. 6B) on leads C4 and C5 (FIG. 6A). This action causes the relays K1 and K2 on the Remote Line circuit (FIG. 4) to release at the end of the FSR ring burst.

I claim:

1. A ringing control system for use on a subscriber digital multiplex network for intercommunication of ringing signals of any of a plurality of types from an exchange over a multiple channel digital span line to a line to be rung at a remote terminal, comprising a line circuit for each line at said exchange, means in each line circuit for producing binary signals in response to alternating current ringing signals received from the exchange, means in each line circuit for temporarily storing binary signals produced, means in each line circuit for transmitting stored binary signals as digital words representative of ringing signals over a time division channel allocated to the line of the respective line circuit, a signaling interface common to plural lines of said exchange, said interface receptive of digital words from the line circuits for verifying received words as representative of actual ringing signals and recoding the words for transmission over a multiple channel span line to the remote terminal, a line circuit in said remote terminal individual to each of the lines, and means in each of said terminal line circuits for receiving recoded words from the span line, and means in each terminal line circuit for decoding words directed to that terminal line circuit from the span line for causing the generation of ringing signals consistent with the type of signal received from the exchange.

2. A ringing control system as claimed in claim 1, in which said binary signal producing means comprises voltage comparators for comparing the voltage of ringing signals received by an exchange line circuit against a reference voltage to produce a binary signal when the voltage of the received signal exceeds the reference voltage.

3. A ringing control system as claimed in claim 2, in which said temporary storing means comprises parallel to serial transfer means with separate inputs for types of ringing signals.

4. A ringing control system as claimed in claim 2, in which said temporary storing means comprises a parallel input-serial output shift register.

5. A ringing control system as claimed in claim 2, in which each of said terminal line circuits includes a series to parallel transfer means and ring control means receptive of signals from said transfer means for causing the production of output ringing signals.

6. In a digital multiplexer network including a central terminal and a remote terminal communicating through a time division multiple channel path, where said remote terminal serves a plurality of lines, a ringing control system for providing ringing signals from the central terminal to the remote terminal for ringing a called one or more of said plurality of lines, said system including a line circuit in said central terminal for each of said lines, a ringing control circuit in said central terminal communicating with said central terminal line circuits over a multiple channel time division bus, means in one of said terminal line circuits responsive to a ringing signal directed to the line of that line circuit for producing a series of code words representing said ringing signal for transmission to said ringing control circuit, means in said ringing control circuit for evaluating said series of code words and for translating said words into timed series of words for transmission to the called line over a channel allocated to a call to the called line, and means in the remote terminal for recreating a ringing signal from the timed series of code words.

7. In a digital multiplexer network as claimed in claim 6, each central terminal line circuit including means for detecting a signal greater than a predetermined level for producing a coded output signal to said ringing control circuit, said evaluating means in said ringing control circuit operative to separate random coded output signals from valid ringing signals to translate only valid ringing signals into said timed series of words for transmission.

* * * * *